United States Patent
Feng et al.

(10) Patent No.: US 12,099,612 B2
(45) Date of Patent: Sep. 24, 2024

(54) FIRMWARE CORRUPTION RECOVERY

(71) Applicant: Hewlett-Packard Development Company, L.P., Spring, TX (US)

(72) Inventors: Kang-Ning Feng, Taipei (TW); Ming Chang Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/794,942

(22) PCT Filed: Jan. 27, 2020

(86) PCT No.: PCT/US2020/015140
§ 371 (c)(1),
(2) Date: Jul. 22, 2022

(87) PCT Pub. No.: WO2021/154200
PCT Pub. Date: Aug. 5, 2021

(65) Prior Publication Data
US 2023/0087221 A1    Mar. 23, 2023

(51) Int. Cl.
*G06F 21/57* (2013.01)
*G06F 11/14* (2006.01)

(52) U.S. Cl.
CPC ........ *G06F 21/572* (2013.01); *G06F 11/1417* (2013.01); *G06F 11/1469* (2013.01); *G06F 21/575* (2013.01); *G06F 11/1433* (2013.01)

(58) Field of Classification Search
CPC ............... G06F 21/572; G06F 11/1417; G06F 11/1469; G06F 21/575
See application file for complete search history.

(56) References Cited

U.S. PATENT DOCUMENTS

| 6,934,873 B2 | 8/2005 | Lu et al. |
| 7,673,301 B1 * | 3/2010 | Righi ............... H04L 67/34 717/172 |

(Continued)

FOREIGN PATENT DOCUMENTS

| CN | 102439565 A | 5/2012 |
| RU | 2583714 C2 | 5/2016 |

(Continued)

OTHER PUBLICATIONS

Windows Platform Binary Table (WPBT); Microsoft; Jul. 8, 2015. (Year: 2015).*

(Continued)

*Primary Examiner* — Glenn A. Auve
(74) *Attorney, Agent, or Firm* — Quarles & Brady LLP (57) ABSTRACT

In some examples, a computing device comprises a processing resource and a memory resource storing instructions to cause the processing resource to detect, by a basic input/output system (BIOS) of the computing device, firmware corruption in a firmware component of the computing device, generate a recovery agent based on the detected firmware corruption of the firmware component, determine a location of a back-up image of the firmware component based on the generated recovery agent, determine recovery sequence based on the determination of the location of the back-up image of the firmware component; and recover the firmware of the firmware component by executing the determined recovery sequence.

20 Claims, 3 Drawing Sheets

(56) References Cited

U.S. PATENT DOCUMENTS

| | | | |
|---|---|---|---|
| 7,809,836 B2 | 10/2010 | Mihm et al. | |
| 9,921,915 B2 | 3/2018 | Hung | |
| 10,395,038 B2 | 8/2019 | Chang et al. | |
| 10,560,743 B2* | 2/2020 | Cadon | H04N 21/443 |
| 2004/0030877 A1 | 2/2004 | Frid | |
| 2007/0169088 A1 | 7/2007 | Lambert et al. | |
| 2009/0249120 A1* | 10/2009 | Yao | G06F 11/1417 |
| | | | 714/15 |
| 2010/0153696 A1 | 6/2010 | Beachem et al. | |
| 2013/0262877 A1* | 10/2013 | Neve De Mevergnies | |
| | | | G06F 21/602 |
| | | | 726/19 |
| 2013/0268746 A1* | 10/2013 | Hsu | G06F 11/1417 |
| | | | 713/2 |
| 2013/0276113 A1 | 10/2013 | Dalcher et al. | |
| 2014/0007073 A1 | 1/2014 | Cavalaris et al. | |
| 2016/0140038 A1* | 5/2016 | Anbazhagan | G06F 21/575 |
| | | | 711/202 |
| 2016/0188430 A1* | 6/2016 | Nitta | G06F 11/2094 |
| | | | 714/6.3 |
| 2017/0085383 A1 | 3/2017 | Rao et al. | |
| 2018/0276002 A1 | 9/2018 | Roszak et al. | |
| 2018/0322012 A1 | 11/2018 | Sharma et al. | |
| 2019/0236277 A1* | 8/2019 | Chang | G06F 21/64 |
| 2019/0286436 A1 | 9/2019 | Liu et al. | |
| 2019/0339958 A1 | 11/2019 | Joshi et al. | |
| 2019/0391799 A1 | 12/2019 | Samuel et al. | |
| 2020/0097658 A1* | 3/2020 | Samuel | G06F 11/0793 |
| 2020/0201714 A1* | 6/2020 | Montero | G06F 11/1469 |
| 2020/0348946 A1* | 11/2020 | Pant | G06F 11/1417 |
| 2021/0157921 A1* | 5/2021 | Brown | G06F 21/575 |
| 2021/0357499 A1* | 11/2021 | Jeansonne | G06F 11/1469 |
| 2022/0179960 A1* | 6/2022 | Spangler | H04L 9/3239 |

FOREIGN PATENT DOCUMENTS

| | | |
|---|---|---|
| TW | 201523277 A | 6/2015 |
| TW | 201523447 A | 6/2015 |
| TW | 201715387 A | 5/2017 |
| TW | 201715395 A | 5/2017 |
| TW | 202004496 A | 1/2020 |

OTHER PUBLICATIONS

EPO Machine translation of RU 2583714 C2 (Year: 2016).*
Datasheet, "Intel® RealSense™ Depth Camera D400-Series", Intel® RealSense, Sep. 2001, pp. 32, Retrieved from the Internet: https://www.mouser.com/pdfdocs/Intel D 400 Series Datasheet.pdf, retrieved on Nov. 22, 2019.

* cited by examiner

FIRMWARE CORRUPTION RECOVERY

BACKGROUND

Firmware can provide low-level control for some or all of a computing device's hardware. Computing devices can include firmware components (e.g., controllers, processors, sensors, camera, and others) that utilize the firmware. Firmware components can be corrupted during firmware updates, power surges, blackouts, improper voltage from a computing device's power supply unit, and/or other electrical events.

DETAILED DESCRIPTION

A computing device can utilize a basic input-output system (BIOS) to perform certain actions. As used herein, the term "BIOS" refers to a non-volatile firmware component to perform hardware initialization during a startup sequence of the computing device and to provide runtime services for operating systems (OSes) and/or other programs. For example, as a computing device is started (e.g., booted), the BIOS can initialize hardware of the computing device.

As used herein, the term "computing device" refers to a mechanical or electrical device that transmits or modifies energy to perform or assist in the performance of human tasks. Example computing devices include a laptop computer, a notebook computer, a desktop computer, and/or a mobile device (e.g., a smart phone, tablet, personal digital assistant, smart glasses, a wrist-worn device, etc.), among other types of computing devices. As used herein, a mobile device can include computing devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices. As used herein, the term "operating system" (OS) refers to software that supports a computing device's basic functions, such as scheduling tasks, executing applications, and/or controlling peripheral devices. As used herein, the term "firmware" refers to software that provides control of particular hardware of a computing device. As used herein, the term "firmware component" refers to a device containing the firmware and/or utilizing (e.g., being controlled by) the firmware. For example, a power delivery controller, a thunderbolt controller, a camera, a card reader, a fingerprint reader, etc., can each include its own firmware. The firmware of the firmware components can be updated.

In some examples, a firmware and a firmware component associated with the firmware can have firmware corruption while being updated. As used herein, the term "firmware corruption", or "corrupted firmware" refers to a failure of transmission and/or processing which can introduce unintended changes to the original data and can cause the computing device to crash and or be damaged permanently. Such corruption can cause permanent damage to the firmware component and result in expensive replacement. In some examples, a firmware corruption can cause the computing device to function slowly and/or may cause the computing device to not respond. The corrupted firmware components can be detected using an OS and/or customer service may detect and recover corrupted firmware components of a computing device. For instance, in some approaches, end users identify the firmware corruption and get recovery engineers involved to recover the corrupted firmware. Such processes can be time consuming and expensive.

In other approaches, a firmware corruption of a firmware component may be detected and recovered manually. For example, a user may receive an error notification from an event-log and/or a Windows Device Manager (WDM). Based on the notification, the user may ask for help from helpdesk and/or self-diagnose that a firmware is corrupted and download a firmware update package to recover the firmware component. However, such approaches can be time consuming, involve require expensive recovery engineers to detect and recover corruption. Additionally, such approaches can cause additional corruption to firmware components.

In some previous approaches, a user may manually use an OS level Firmware Update & Recovery (FUR) application, to update, download and/or recover firmware of a firmware component. Prior to updating, the FUR application can back-up the BIOS and firmware images of the firmware component into the storage device of the computing device. If the BIOS detects a firmware component image during a power-on self-test (POST) sequence of the computing device, then the BIOS can read out the back-up version of firmware component image to recover that firmware component. As used herein, the term "POST sequence" refers to a process performed by firmware and/or software routines after a computing device is powered on to determine whether hardware of the computing device is working correctly. If the BIOS does not detect a firmware component image during the POST sequence, the OS of the computing device is rebooted. However, in such a recovery system, a back-up image in the storage device cannot be used to recover the firmware of the firmware component.

In some other approaches, a firmware image of a redundant firmware component may be integrated in the BIOS image area and saved in a Flash read only memory (ROM) when the BIOS is updated. In an instance when a firmware component is corrupted, the BIOS can use the integrated redundant firmware image to recover firmware component. However, such a recovery system can be costly as it can include the use of a larger Flash ROM.

Firmware component recovery, according to the disclosure, can use a BIOS to detect a firmware component whose firmware is corrupted, detect a recovery agent from the framework in the BIOS itself, determine a location of the back-up image of the firmware component, determine a recovery sequence based on the location of the back-up image, and recover the firmware component. Such a firmware component recovery process can be automated as a user does not, in some examples, identify which firmware component is corrupted. Additionally, as the recovery agent is integrated in the BIOS, a newly installed clean OS can be supported by the firmware component recovery process, as further described herein.

In some examples, a firmware corruption recovery process of a computing device can detect the corruption by a BIOS of the computing device and generate a recovery agent based on the detected firmware corruption of the firmware corruption. As used herein, the term "recovery agent" refers to a table comprising an Advanced Configuration and Power Interface (ACPI) and a Windows Platform Binary Table (WPBT) to generate an algorithm based on the detected corruption by the BIOS, as further described herein. The recovery agent can determine a location of the back-up image of the firmware component, determine a recovery sequence based on the location of the back-up image, and recover the firmware component. As used herein, the term "back-up image" refers to a computer file that can create a duplicate of a firmware of a firmware component. A unified and automated corruption detection and recovery process can be cost effective with limited user intervention.

Figure 1:
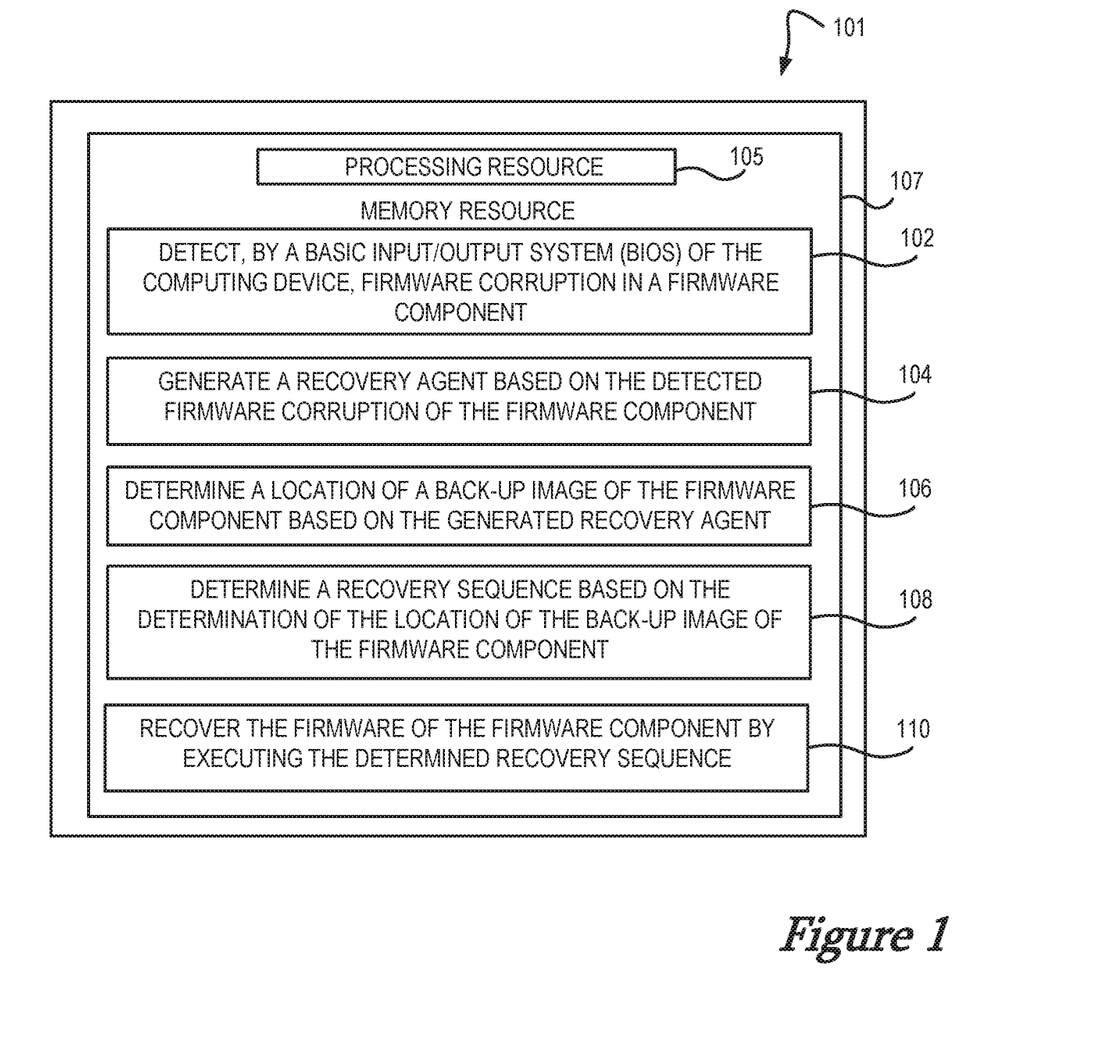
FIG. 1 illustrates an example of a computing device for firmware corruption recovery consistent with the disclosure.

FIG. 1 illustrates an example of a computing device 101 for a firmware corruption recovery consistent with the disclosure. The computing device 101 can include processing resource 105, communicatively coupled to a memory resource 107 on which instructions may be stored, such as instructions 102, 104, 106, 108, and 110. As used herein, the term "processing resource" refers to a central processing unit (CPU), microprocessor, and/or other hardware device suitable for retrieval and execution of instructions stored in a memory resource. Processing resource 105 may be a CPU, microprocessor, and/or other hardware device suitable for retrieval and execution of instructions stored in memory resource 107. The processing resource 105 may detect, generate, determine, and recover stored instructions to perform actions related firmware corruption recovery.

As used herein, "communicatively coupled" can include coupled via various wired and/or wireless connections between devices such that data can be transferred in various directions between the devices. Although the following descriptions refer to a processing resource and a memory resource, the descriptions may also apply to a system and/or computing device with multiple processing resources and multiple memory resources. In such examples, the instructions may be distributed (e.g., stored) across multiple non-transitory machine-readable storage media and the instructions may be distributed (e.g., executed by) across multiple processing resources.

Memory resource 107 may be any electronic, magnetic, optical, or other physical storage device that stores executable instructions 102, 104, 106, 108, and 110. Thus, memory resource 107 may be, for example, Random Access Memory (RAM), an Electrically-Erasable Programmable Read-Only Memory (EEPROM), a storage drive, an optical disc, and the like. Memory resource 105 may be disposed within the computing device 101, as shown in FIG. 1. Additionally, memory resource 107 may be a portable, external or remote storage medium, for example, that causes the computing device 101 to download the instructions 102, 104, 106, 108, and 110 from the portable/external/remote storage medium.

Instructions 102, when executed by a processing resource, such as the processing resource 105, can cause the computing device 101 to detect, by the BIOS of the computing device, a firmware corruption in a firmware component of the computing device. The BIOS of the computing device 101 can be a non-volatile firmware component that can perform hardware initialization during a startup of the computing device 101. In some examples, the BIOS of the computing device can detect a firmware of the firmware component (e.g., power delivery controller, sensor, camera, etc.) is corrupted if the computing device 101 is not initializing. In some examples, using the BIOS, a firmware corruption of the firmware component can be recovered via an OS interface, as further described herein.

In some examples, the BIOS can take control of the computing device 101 when the computing device 101 is initialized during a startup sequence. The BIOS can include a pre-EFI initialization (PEI) phase. During the PEI phase, the BIOS can detect corruption of the firmware, storage space, and provide a reason to restart the computing device 101. In some examples, the BIOS can move to a Driver execution Environment (DXE) phase. In this phase, the BIOS of the computing device 101 can discover and execute the DXE drivers in the correct order. The DXE drivers can be responsible for initializing the firmware components among other parts of the computing device 101. In some examples, at the DXE phase, if the BIOS of the computing device 101 does not detect a firmware corruption of a firmware component, the computing device 101 can boot an OS of the computing device 101 by a boot device selection (BDS). In some examples, if the BIOS detects a firmware corruption, the BIOS can enter the information regarding the detected firmware corruption in the computing device 101 memory system.

Instructions 104, when executed by a processing resource, such as the processing resource 105, can cause the computing device 101 to generate a recovery agent based on the detected firmware corruption of the firmware component. In some examples, the recovery agent can be integrated in the BIOS. In some examples, the computing device 101 can include a recovery agent that can be a table comprising an ACPI and a WPBT. As used herein, the term "table" refers to an arrangement of data of the recovery agent.

The computing device 101 can generate the table during POST sequence by the BIOS. The POST sequence can perform firmware routines after the computing device 101 is powered on to determine whether hardware of the computing device is working correctly. For example, the computing device 101 can run a POST sequence when powered on to determine whether certain hardware (e.g., random access memory (RAM), firmware components, and/or other hardware) of the computing device 101 is working correctly or has been corrupted. In response to determining a firmware corruption of the firmware component, the computing device 101 can generate the recovery agent.

In some examples, based on the cause of the firmware corruption of the computing device 101, the data arrangement of the recovery agent can be different. For example, the recovery agent can include a first data arrangement for firmware corruption caused by power surges, blackouts, and/or other electrical events and can have a second data arrangement for firmware corruption caused by shutdown during firmware update.

The recovery agent of the computing device 101 can include an ACPI and a WPBT table. The ACPI can bring the power management of the computing device 101 under the control of the OS. In some examples, the ACPI can advertise the available firmware components and their functions to the OS using instruction lists provided through the firmware. In some examples, the ACPI can specify how the BIOS, OS, and firmware components of the computing device 101 can communicate with each other about power usage. In some examples, the ACPI interface can be provided to the computing device 101 under an ACPI OS. Said differently, the computing device 101 can receive the recovery agent from the BIOS via the ACPI interface.

The WPBT of the recovery agent can enable a firmware to provide an OS with a platform binary that the OS can execute. The binary handoff medium can be a physical memory, allowing the firmware to provide the platform binary without modifying the firmware image in a local storage and/or server. In some examples, the WPBT can include a physical address pointer to a flat, Portable Executable (PE) firmware image that has been copied to a local memory.

In some examples, the BIOS of the computing device 101 can publish the recovery agent table that comprises the ACPI and WPBT, as further discussed herein. As used herein, the term "publish" can refer to the BIOS completing the preparation of data to build the ACPI and WPBT table.

Instructions 106, when executed by a processing resource such as the processing resource 105, can cause the computing device 101 to determine a location of a back-up image of the firmware component based on the generated recovery agent. As described herein, the back-up image can be a duplicate of the firmware of the firmware component. In some examples, the location of the back-up image of the firmware component can be in a first location of the computing device. In some examples, the first location can be a local memory of the computing device 101.

In some examples, based on the recovery agent generated, the location of the back-up image of the firmware of firmware component can be different. For example, the recovery agent, integrated with the BIOS, can build a customized ACPI table. As used herein, the term "customized ACPI" refers to ACPI data that has been modified to indicate which firmware component is corrupt. The customized ACPI table can be created during an UEFI/BIOS POST time. In some examples, the customized ACPI table can include an ACPI table header with customized information based on prompts received from the recovery agent.

Based on the presence of the customized ACPI table, the instructions 106, when executed by the processing resource 105, can cause the computing device 101 to determine the location of the back-up image of the corrupt firmware component to be in the first location of the computing device 101.

In some examples, the location of the back-up image of the firmware component can be in a server associated with the computing device. In response to the customized ACPI table not being present, the instructions 106, when executed by the processing resource 105, can cause the computing device 101 to determine the location of the back-up image to be in a second location. In some examples, the second location can be the server of the computing device 101. As used herein, the term "server" refers to computer program or and/or a device that provides functionality for other programs or devices, called clients. In some examples, the second location can be a server of a computing device other than the computing device 101.

In some examples, the computing device 101 can determine that the back-up image of the firmware component is in the local storage and/or in the server of the computing device 101. If it is determined that the back-up image is absent, an alert can be generated to notify the firmware corruption of the firmware component. In some examples, the alert can be received by a user. In some examples, the alert can be received by a computer interface.

Instructions 108, when executed by a processing resource such as the processing resource 105, can cause the computing device 101 to determine a recovery sequence based on the determination of the location of the back-up image of the firmware component. As discussed herein, the term "recovery sequence" refers to a series of selective actions taken to recover a corrupted firmware of a firmware component. The recovery sequence of the firmware of the firmware component can be based on the location of the back-up image, determination of whether the customized ACPI is present or not, the WPBT command line parameter, etc., as further discussed herein.

In some examples, the recovery sequence can include recovering the corrupted firmware component (e.g., recovering immediately) and rebooting the OS. In some examples, the recovery sequence can include notifying a user to contact a recovery engineer. In some examples, the recovery sequence can include triggering an event log to initialize the firmware recovery by the BIOS.

Instructions 110 when executed by a processing resource such as the processing resource 105, can cause the computing device 101 to recover the firmware of the firmware component by executing the determined recovery sequence. A notification can be generated when the recovery of the firmware corruption is completed.

The firmware corruption recovery, according to the disclosure, can allow the BIOS to recover the firmware components in the computing device and streamline the recovery process. The BIOS can support component firmware recovery and can avoid including redundant firmware image when a user is upgrading a system. The recovery agent can determine the location of the back-up image of the corrupted firmware component and determine a recovery sequence based on the location of the back-up image. This can help eliminate additional ROM to store redundant firmware image of each component and help with cost reduction.

Figure 2:
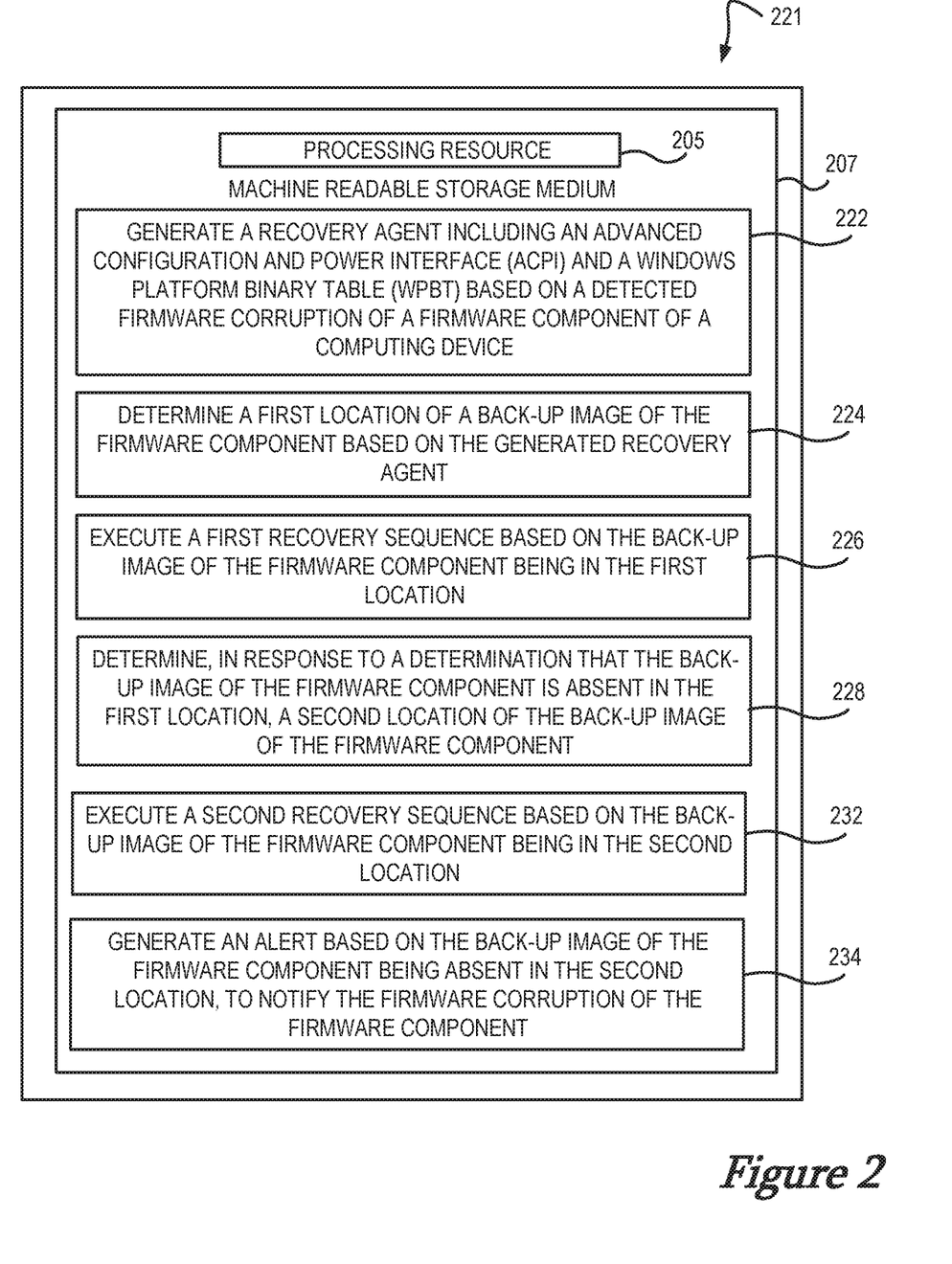
FIG. 2 illustrates a block diagram of a computing device suitable for firmware corruption recovery consistent with the disclosure.

FIG. 2 illustrates a block diagram of a computing device 221 suitable for firmware corruption recovery consistent with the disclosure. The computing device 221 can include a processing resource 205, communicatively coupled to a non-transitory machine-readable storage medium 207 on which instructions may be stored, such as instructions 222, 224, 226, 228, 232, and 234. Processing resource 205 can be analogous to processing resource 105 described in relation to FIG. 1. Non-transitory machine-readable storage medium 207 can be analogous to memory resource 107 described in relation to FIG. 1. Machine-readable storage medium 207 may be a portable, external or remote storage medium, for example, that allows the computing device 221 to download the instructions from the portable/external/remote storage medium. In this situation, the executable instructions may be part of an "installation package". As described herein, machine-readable storage medium 207 may be encoded with executable instructions associated with firmware corruption recovery.

Instructions 222 when executed by a processing resource such as the processing resource 205, can cause the computing device 221 to generate a recovery agent including an ACPI and a WPBT interface based on a detected firmware corruption of a firmware component of the computing device 221. The recovery agent, in some instances, can be placed in a memory resource such as non-transitory machine-readable storage medium 207 via the BIOS. In such an example, the WPBT can instruct the OS with respect to a location of the recovery agent and can instruct the OS how to run the recovery agent. In some examples, a customized ACPI can provide information about the corrupted firmware of the firmware component including an indication regarding whether or not a recovery of the firmware component is warranted. In some instances, when the OS identifies the WPBT, the OS can use information in the WPBT to search the memory resource and/or a system memory address of the recovery agent and then run the recovery agent. Once the recovery agent is running, the recovery agent can attempt to locate the customized ACPI table to determine which firmware component should be repaired. Responsive to that determination, the recovery process can be initiated.

Put another way, in some examples, computing device 221 can detect a firmware corruption and recover the corruption. A firmware corruption recovery process of the computing device 221 can detect the firmware corruption by a BIOS of the computing device 221 and generate a recovery agent based on the detected firmware corruption of the firmware corruption. The recovery agent can be integrated in the BIOS of the computing device 221.

In some examples, the computing device 221 can include a recovery agent that can be a table comprising an ACPI and a WPBT. The ACPI can bring the power management of the computing device 201 under the control of the OS. In some examples, the ACPI can advertise the available firmware components and their functions to the OS using instruction lists provided through the firmware. In some examples, the ACPI can specify how the BIOS, OS, and firmware components of the computing device 201 can communicate with each other about power usage.

The WPBT of the recovery agent can enable a firmware to provide an OS with a platform binary that the OS can execute. The binary handoff medium can be a physical memory, allowing the firmware to provide the platform binary without modifying the firmware image in a local storage and/or server. In some examples, the WPBT can include a physical address pointer to a flat, PE firmware image that has been copied to a local memory.

In some examples, the BIOS of the computing device 221 can publish the recovery agent table that comprises the ACPI and WPBT. As used herein, the term "publishing" can refer to the BIOS completing the preparation of data to build the ACPI and WPBT table. For example, the BIOS can complete the relevant data to build WPBT table in the local memory. In some examples, the BIOS can complete the relevant data to build customized ACPI table in the local memory. The customized ACPI can indicate which firmware of the firmware component is corrupt. In some examples, instructions 222 can include instructions executable by the processing resource 205 to determine parameters for the firmware component to be recovered using the recovery agent. Parameters for the firmware component, for example, can include physical location of the memory and/or the server of the computing device.

Instructions 224 when executed by a processing resource such as the processing resource 205, can cause the computing device 221 to determine a first location of a back-up image of the firmware component based on the generated recovery agent. The computing device 221 can determine the first location of the back-up image of the firmware component based on the generated recovery agent.

In some examples, the first location of the back-up image of the firmware component can be in a first location of the computing device 221. For example, the recovery agent, integrated with the BIOS, can build a customized ACPI table. Based on the presence of the customized ACPI table, the instructions 224, when executed by the processing resource 205, can cause the computing device 221 to determine the first location of the back-up image of the corrupt firmware component to be in the first location of the computing device 221. In some examples, the first location can be a local memory of the computing device 221.

Instructions 226 when executed by a processing resource such as the processing resource 205, can cause the computing device 221 to execute a first recovery sequence based on the back-up image of the firmware component being in the first location. Based on the determination that the back-up image is located in the first location, the computing device 221 can execute a first recovery sequence.

The first recovery sequence can include a first and a second selective action to be taken to recover the corrupted firmware of a firmware component. In some examples, the first recovery sequence can be determined based on the presence of the customized ACPI in the first location. In some examples, if the customized ACPI is determined to be present, the first recovery sequence can include a first selective action and a second selective action. The first selective action can be, for example, to prepare a recovery firmware component via a Unified Extensible Firmware Interface (UEFI) capsule update. The second selective action can be, for example, to send a notification to a user to receive consent whether to proceed with rebooting and recovering the firmware component immediately or later.

Instructions 228 when executed by a processing resource such as the processing resource 205, can cause the computing device 221 to determine, in response to a determination that the back-up image of the firmware component is absent in the first location, a second location of the back-up image of the firmware component. If the customized ACPI table is determined, by the recovery agent, to be absent, the instructions 228 can cause the computing device 221 to determine the location of the back-up image.

In some examples, the back-up image can be determined to be in a second location. In some examples, the second location can be the server of the computing device 221. In some examples, the second location can be a server of a computing device other than the computing device 221.

Instructions 232 when executed by a processing resource such as the processing resource 205, can cause the computing device 221 to execute a second recovery sequence based on the back-up image of the firmware component being in the second location. The second recovery sequence can include a third selective action, in addition to the first and the second selection action, as discussed herein. The third selection action can include, for example, copying the back-up image from the second location to the first location In some examples, the second recovery sequence can include triggering an event-log. As used herein the term "event-log" refers to recording events of a system. In some examples, the second recovery sequence can trigger recording the firmware corruption event. The event-log can provide an audit trail that can be used to understand the reason behind the corruption, compare with previous firmware corruption events of the firmware component, etc. In some examples, the second recovery sequence can include the BIOS to take control of the computing device 221.

Instructions 234 when executed by a processing resource such as the processing resource 205, can cause the computing device 221 to generate an alert, based on the back-up firmware image of the firmware component being absent in the second location, to notify the firmware corruption of the firmware component. In some examples, the computing device 221 can determine that the back-up image of the firmware component is absent in the first location and in the second location. In such a determination of the back-up image being absent, an alert can be generated to notify the firmware corruption of the firmware component. In some examples, the alert can be received by a user. In some examples, the alert can be received by a computer interface. Example alerts include, for instance, pop up notifications on the computing device, receive an electronic message, receiving an alert message on a mobile device, etc.

Figure 3:
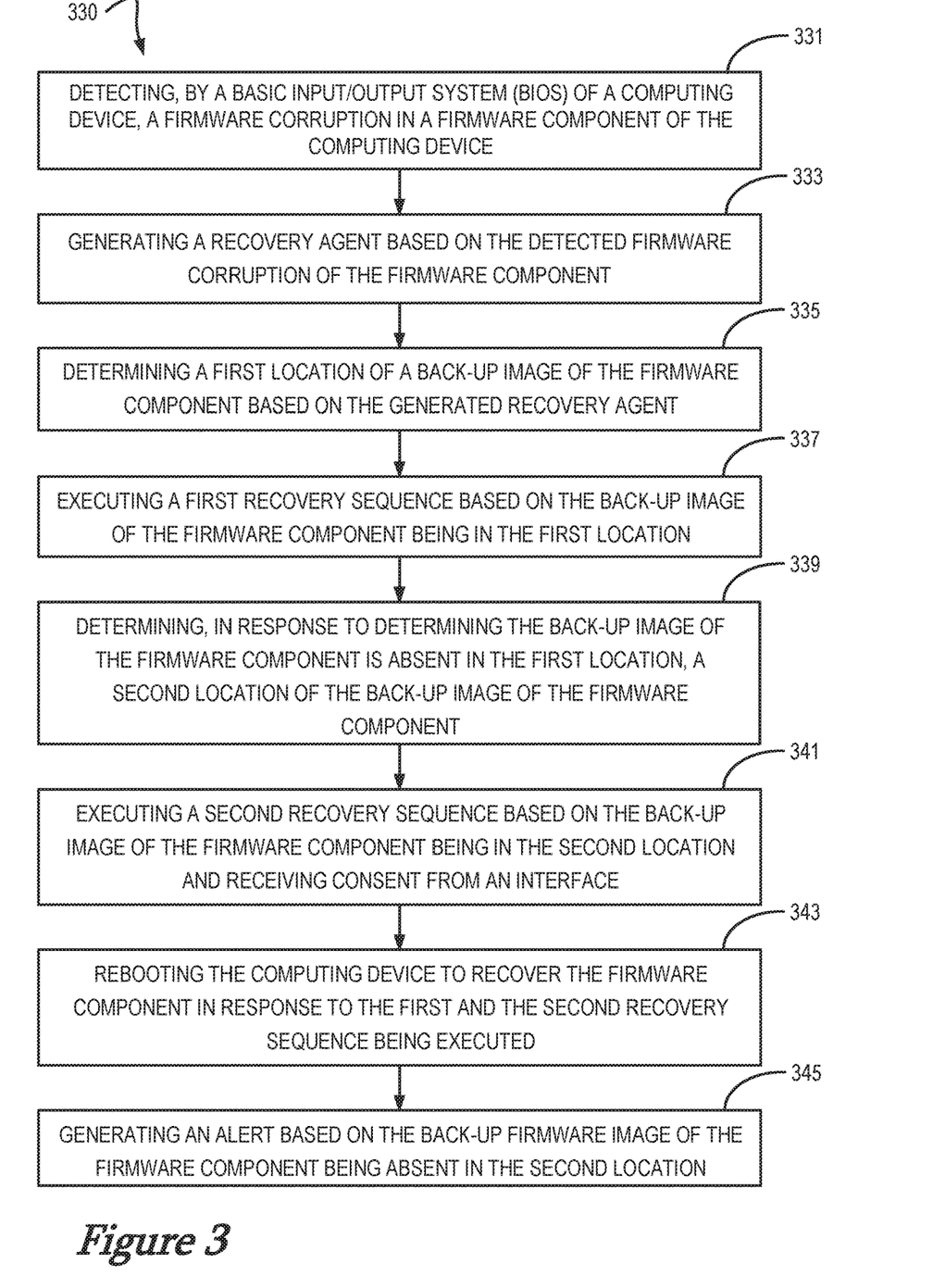
FIG. 3 illustrates an example of a method for firmware corruption recovery consistent with the disclosure.

FIG. 3 illustrates an example of a method 330 for firmware corruption recovery consistent with the disclosure. For example, method 330 can be performed by a computing device (e.g., computing device 101, 221 as previously described in connection with FIGS. 1 and 2, respectively).

At 331, the method 330 includes detecting, by a BIOS of a computing device, a firmware corruption in a firmware component of the computing device. In some examples, using the BIOS, a firmware corruption of the firmware component can be recovered via an OS interface. The BIOS of the computing device can detect a firmware of the firmware component is corrupted if the computing device not initializing. In some examples, using the BIOS, a firmware corruption of the firmware component can be recovered via an OS interface.

The method 330, at 333, includes generating a recovery agent based on the detected firmware corruption of the firmware component. In some examples, the recovery agent can be integrated in the BIOS. In some examples, a computing device can include a recovery agent that can be a table comprising an ACPI and a WPBT.

The ACPI can bring the power management of the computing device under the control of the OS. In some examples, the ACPI can specify how the BIOS, OS, and firmware components of the computing device can communicate with each other about power usage. The WPBT of the recovery agent can enable a firmware to provide an OS with a platform binary that the OS can execute.

At 335, the method 330 includes determining a first location of a back-up image of the firmware component based on the generated recovery agent. For example, at 335 the method can determine a duplicate of the firmware of the firmware component is in a first location. In some examples, the first location can be a local memory of the computing device.

In some examples, the recovery agent, integrated with the BIOS of the computing device, can build a customized ACPI table. Based on the presence of the customized ACPI, the computing device can determine that the back-image of the corrupted firmware is in the local memory/the first location.

The method 330, at 337, includes executing a first recovery sequence based on the back-up image of the firmware component being in the first location. Based on the determination that the back-up image is located in the first location, the method 330 can execute a first recovery sequence that can include a set of selective actions. The set of selective actions can include, for example, preparing a recovery firmware component via a UEFI capsule update, to receive consent from a user regarding user rebooting the computing device, etc.

At 339, the method 330 includes determining, in response to determining the back-up image of the firmware component is absent in the first location, a second location of the back-up image of the firmware component. For example, if the computing device determines that the back-up image is absent in the first location, then the computing device can search a second location (e.g., server) to determine if the back-up image is present in the second location.

In some examples, the determination of the second location is based on the determination that a customized ACPI table is absent in the first location and is present in the second location. If the back-up image is located in the second location, a second recovery sequence can be generated.

At 341, the method 330 includes executing a second recovery sequence based on the back-up image of the firmware component being in the second location and receiving consent from an interface. For example, the recovery agent can determine a second recovery sequence based on the determination that the back-up image is in the second location. In some examples, the second recovery sequence can include copying the back-up image from the second location to the first location, and automatically boot the OS upon completion of the copying of the back-up image. In some examples, the second recovery sequence can include asking for a user's consent whether to boot the OS at first time period or at a second time period. The first time period can be the time period when the copying of the back-up image has been completed. In some examples, the second time period can be a time period later than the first time period.

At 343, the method 330 includes rebooting the computing device to recover the firmware component in response to the first and the second recovery sequence being executed. In some examples, the OS can be rebooted based on the determined recovery sequence. In some examples, the rebooting can be a normal BIOS sequence.

At 345, the method 330 includes generating an alert based on the back-up firmware image of the firmware component being absent in the second location. In some examples, back-up image of the firmware can be absent in the first location and the second location. If the back-up image is absent in the first location and the second location, the method can generate an alert to notify an interface.

For example, a user can be alerted via a notification that the back-up image is absent and that a recovery sequence cannot be generated. Based on the notification, the user can determine the next step that has to be taken to recover the firmware of the firmware component. For example, the user can decide to call a recovery manager and/or force boot to recover firmware of the firmware component.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 105 may refer to element 105 in FIG. 1 and an analogous element may be identified by reference numeral 205 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications and use of the system and method of the disclosure. Since many examples can be made without departing from the spirit and scope of the system and method of the disclosure, this specification merely sets forth some of the many possible example configurations and implementations.

What is claimed is:

1. A computing device, comprising:
   a processing resource; and
   a memory resource storing machine-readable instructions that, when executed by the processing resource, cause the processing resource to:
   detect, by a basic input/output system (BIOS) of the computing device, firmware corruption in a firmware component of the computing device;
   generate a recovery agent based on the detected firmware corruption of the firmware component, wherein the recovery agent is integrated in the BIOS;
   determine a location of a back-up image of the firmware component based on the generated recovery agent;
   determine a recovery sequence based on the determination of the location of the back-up image of the firmware component; and
   recover the firmware of the firmware component by executing the determined recovery sequence.

2. The computing device of claim 1, wherein the recovery agent is a table comprising an Advanced Configuration and Power Interface (ACPI) and a Windows Platform Binary Table (WPBT).

3. The computing device of claim 1, wherein the location of the back-up image of the firmware component is in a local storage of the computing device.

4. The computing device of claim 1, wherein the machine-readable instructions, when executed by the processing resource, cause the processing resource to:
   determine that the back-up image of the firmware component is absent from a local storage of the computing device; and
   using the recovery agent, determine that the location of the back-up image of the firmware component is external to the computing device.

5. The computing device of claim 4, wherein the location of the back-up up image of the firmware component is in a server associated with the computing device.

6. The computing device of claim 5, wherein the machine-readable instructions, when executed by the processing resource, cause the processing resource to copy the back-up image of the firmware component from the server to the local storage of the computing device.

7. The computing device of claim 5, wherein the machine-readable instructions, when executed by the processing resource, cause the processing resource to search the server associated with the computing device to determine that the location of the back-up image of the firmware component is in the server associated with the computing device.

8. The computing device of claim 1, wherein the machine-readable instructions, when executed by the processing resource, cause the processing resource to generate an alert responsive to determining that the back-up image of the firmware component is absent from a local storage of the computing device.

9. The computing device of claim 1, wherein the firmware component comprises a camera, a card reader, a fingerprint reader, or a sensor.

10. The computing device of claim 1, wherein the machine-readable instructions, when executed by the processing resource, cause the processing resource to publish the recovery agent using the BIOS of the computing device.

11. A non-transitory machine readable medium storing instructions executable by a processing resource to cause the processing resource to:
    generate a recovery agent including an Advanced Configuration and Power Interface (ACPI) and a Windows Platform Binary Table (WPBT) based on a detected firmware corruption of a firmware component of a computing device, wherein the recovery agent is integrated in a basic input/output system (BIOS) of the computing device;
    determine that a back-up image of the firmware component is absent from a first location based on the generated recovery agent, the first location comprising a local storage of the computing device;
    determine that the back-up image of the firmware component is absent from a second location based on the generated recovery agent, the second location comprising a remote server associated with the computing device; and
    generate an alert to notify the firmware corruption of the firmware component responsive to determining that the back-up image of the firmware component is absent from the first location and the second location.

12. The medium of claim 11, comprising instructions executable by the processing resource to cause the processing resource to detect the firmware corruption in the firmware component via the BIOS of the computing device.

13. The medium of claim 11, comprising instructions executable by the processing resource to cause the processing resource to provide the alert to a user of the computing device via a computer interface of the computing device.

14. The medium of claim 11, wherein the firmware component comprises a camera, a card reader, a fingerprint reader, or a sensor.

15. The medium of claim 11, comprising instructions executable by the processing resource to cause the processing resource to publish the recovery agent using the BIOS of the computing device.

16. A method, comprising:
    detecting, by a basic input/output system (BIOS) of a computing device, a firmware corruption in a firmware component of the computing device;
    generating a recovery agent based on the detected firmware corruption of the firmware component, wherein the recovery agent is integrated in the BIOS;
    determining that a back-up image of the firmware component is absent from a first location based on the generated recovery agent, the first location comprising a local storage of the computing device;
    determining, in response to determining the back-up image of the firmware component is absent from the first location, that the back-up image of the firmware component is in a second location, the second location comprising a remote server associated with the computing device;
    executing a recovery sequence responsive to determining that the back-up image of the firmware component is in the second location to recover firmware for the firmware component using the back-up image of the firmware component; and
    rebooting the computing device in response to the recovery sequence being executed.

17. The method of claim 16, further comprising detecting, using the BIOS, the firmware component to be recovered via an operating system (OS) interface.

18. The method of claim 16, further comprising:
generating an alert responsive to determining that the back-up image of the firmware component is absent from the first location; and
creating an event-log in response to the alert being generated.

19. The method of claim 16, wherein the firmware component comprises a camera, a card reader, a fingerprint reader, or a sensor.

20. The method of claim 16, further comprising copying the back-up image of the firmware component from the second location to the first location.

* * * * *

UNITED STATES PATENT AND TRADEMARK OFFICE
CERTIFICATE OF CORRECTION

PATENT NO. : 12,099,612 B2  
APPLICATION NO. : 17/794942  
DATED : September 24, 2024  
INVENTOR(S) : Kang-Ning Feng et al.

Page 1 of 1

It is certified that error appears in the above-identified patent and that said Letters Patent is hereby corrected as shown below:

On the Title Page

Item (57) Abstract, Line 9, "determine recovery" should be --determine a recovery--.

Signed and Sealed this  
Fourth Day of February, 2025

Coke Morgan Stewart  
*Acting Director of the United States Patent and Trademark Office*